United States Patent
Gluth et al.

(10) Patent No.: US 10,295,391 B2
(45) Date of Patent: May 21, 2019

(54) PRF FREQUENCY GENERATOR FOR A FILL LEVEL MEASURING DEVICE

(71) Applicant: Endress + Hauser GmbH + Co. KG, Maulburg (DE)

(72) Inventors: Rolf Gluth, Neu-Ulm (DE); Winfried Mayer, Buch (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 376 days.

(21) Appl. No.: 15/104,015

(22) PCT Filed: Nov. 14, 2014

(86) PCT No.: PCT/EP2014/074653
§ 371 (c)(1),
(2) Date: Jun. 13, 2016

(87) PCT Pub. No.: WO2015/090769
PCT Pub. Date: Jun. 25, 2015

(65) Prior Publication Data
US 2016/0327422 A1   Nov. 10, 2016

(30) Foreign Application Priority Data
Dec. 20, 2013   (DE) .......... 10 2013 114 735

(51) Int. Cl.
*G01S 7/02* (2006.01)
*G01S 13/10* (2006.01)
(Continued)

(52) U.S. Cl.
CPC .......... *G01F 23/284* (2013.01); *G01S 7/282* (2013.01); *G01S 7/285* (2013.01); *G01S 13/103* (2013.01);
(Continued)

(58) Field of Classification Search
CPC ........ G01F 23/284; G01S 7/282; G01S 7/285; G01S 13/103; G01S 13/12; G01S 13/22; G01S 13/227; G01S 13/30
See application file for complete search history.

(56) References Cited

U.S. PATENT DOCUMENTS

| | | | | |
|---|---|---|---|---|
| 4,503,433 | A | * | 3/1985 | Tomasi ................. G01S 13/343 342/124 |
| 4,524,361 | A | * | 6/1985 | Teulings ................. G01S 13/30 342/194 |

(Continued)

FOREIGN PATENT DOCUMENTS

| | | |
|---|---|---|
| DE | 102009032811 A1 | 2/2011 |
| WO | 2015090769 A1 | 6/2015 |

OTHER PUBLICATIONS

German Search Report, German Patent Office, Munich, DE, dated Feb. 27, 2014.
(Continued)

*Primary Examiner* — Peter M Bythrow
(74) *Attorney, Agent, or Firm* — Bacon&Thomas, PLLC (57) ABSTRACT

The invention relates to a frequency generator for generating two pulse repetition frequency signals with slightly different frequencies for a radar measuring device. The frequency generator comprises an oscillator, which generates an oscillator signal, a first signal path for generating a first pulse repetition frequency signal from the oscillator signal, and a second signal path for generating a second pulse repetition frequency signal from the oscillator signal. The first signal path comprises a frequency divider or a first DDS module which is designed to generate a first frequency signal on the basis of the oscillator signal, a first mixer which is designed to upmix the first frequency signal or a signal derived therefrom to an intermediate frequency band and to generate a first intermediate frequency signal, and a first ceramic
(Continued)

bandpass filter which is designed to filter out a selected frequency component of the first intermediate frequency signal and to generate a bandpass-filtered first intermediate frequency signal. The second signal path comprises a second DDS component which is designed to generate a second frequency signal on the basis of the oscillator signal, said second frequency signal differing from the first frequency signal by a specified frequency offset, a second mixer which is designed to upmix the second frequency signal or a signal derived therefrom to an intermediate frequency band and to generate a second intermediate frequency signal, and a second ceramic bandpass filter which is designed to filter out a selected frequency component of the second intermediate frequency signal and to generate a bandpass-filtered second intermediate frequency signal.

14 Claims, 6 Drawing Sheets

(51) Int. Cl.
| | | |
|---|---|---|
| *G01S 13/22* | (2006.01) | |
| *G01S 13/28* | (2006.01) | |
| *G01S 13/30* | (2006.01) | |
| *G01S 13/88* | (2006.01) | |
| *G01S 13/90* | (2006.01) | |
| *G01S 7/282* | (2006.01) | |
| *G01S 7/285* | (2006.01) | |
| *G01F 23/284* | (2006.01) | |

(52) U.S. Cl.
CPC .............. *G01S 13/22* (2013.01); *G01S 13/30* (2013.01); *G01S 13/88* (2013.01); *G01S 13/90* (2013.01); *G01S 7/024* (2013.01); *G01S 13/282* (2013.01)

(56) References Cited

U.S. PATENT DOCUMENTS

| | | | | |
|---|---|---|---|---|
| 5,075,863 A * | 12/1991 | Nagannune | ............ | B22D 2/003 342/130 |
| 5,767,953 A * | 6/1998 | McEwan | ................. | G01C 3/08 356/5.01 |
| 5,774,091 A * | 6/1998 | McEwan | ................. | G01C 3/08 342/126 |
| 6,027,427 A | 2/2000 | Yoo | | |
| 6,072,427 A * | 6/2000 | McEwan | ............... | G01S 7/2806 331/2 |
| 6,486,826 B1 * | 11/2002 | Cramer | ................. | G01F 23/284 342/102 |
| 6,812,824 B1 * | 11/2004 | Goldinger | ............. | G06K 17/00 340/10.1 |
| 8,416,124 B2 | 4/2013 | Gerding | | |
| 8,552,744 B2 * | 10/2013 | Michalski | ............. | G01F 23/284 324/629 |
| 8,844,352 B2 * | 9/2014 | Nilsson | ..................... | G01S 7/28 73/293 |
| 2005/0003785 A1 * | 1/2005 | Jackson | ..................... | G01S 7/35 455/260 |
| 2005/0168379 A1 * | 8/2005 | Griessbaum | .......... | G01F 23/284 342/124 |
| 2006/0000275 A1 * | 1/2006 | Nilsson | .................. | G01F 23/284 73/290 V |
| 2007/0103333 A1 * | 5/2007 | Michalski | ............. | G01F 23/284 340/853.1 |
| 2007/0182621 A1 * | 8/2007 | Fehrenbach | .......... | G01F 23/284 342/124 |
| 2007/0186678 A1 * | 8/2007 | Griessbaum | .......... | G01F 23/284 73/861 |
| 2007/0192391 A1 * | 8/2007 | McEwan | .................. | G01S 7/285 708/271 |
| 2007/0210955 A1 * | 9/2007 | McEwan | .................. | G01S 7/285 342/175 |
| 2008/0024145 A1 * | 1/2008 | Schultheiss | ........... | G01F 23/284 324/644 |
| 2008/0105048 A1 * | 5/2008 | Nilsson | .................. | G01F 23/284 73/290 V |
| 2009/0212997 A1 * | 8/2009 | Michalski | ............. | G01F 23/284 342/137 |
| 2010/0223019 A1 * | 9/2010 | Griessbaum | .......... | G01F 23/284 702/75 |
| 2011/0140951 A1 * | 6/2011 | Nyberg | ............... | G01F 23/0069 342/124 |
| 2011/0181458 A1 * | 7/2011 | Feil | ........................ | G01F 23/284 342/124 |
| 2011/0279306 A1 * | 11/2011 | Mouknatjou | .......... | G01F 23/284 342/124 |
| 2012/0056628 A1 * | 3/2012 | Michalski | ............. | G01F 23/284 324/629 |
| 2012/0092205 A1 * | 4/2012 | Bourdelais | .............. | G01S 7/282 342/21 |
| 2012/0274500 A1 * | 11/2012 | Nyberg | .................. | G01F 23/284 342/124 |
| 2013/0057426 A1 * | 3/2013 | Wenger | .................. | G01F 23/284 342/124 |
| 2013/0333465 A1 * | 12/2013 | Nilsson | ..................... | G01S 7/28 73/290 V |
| 2014/0085130 A1 * | 3/2014 | Edvardsson | .......... | G01F 23/284 342/124 |
| 2014/0125513 A1 * | 5/2014 | Sussman | ................. | G01S 7/483 342/124 |
| 2016/0327422 A1 | 11/2016 | Gluth | | |

OTHER PUBLICATIONS

International Search Report, EPO, The Netherlands, dated Feb. 17, 2015.
English Translation of the International Preliminary Report on Patentability, WIPO, Geneva, CH, dated Jun. 30, 2016.

* cited by examiner

PRF FREQUENCY GENERATOR FOR A FILL LEVEL MEASURING DEVICE

The invention relates to a frequency generator for the generation of pulse repetition frequency signals for a radar measuring device, a radar measuring device for pulse correlation radar, as well as a method for generating pulse repetition frequency signals for a radar measuring device.

Field devices serving to capture and/or modify process variables are frequently used in process automation technology. Examples of field devices of this type are fill level measurement devices, mass flow meters, pressure and temperature measurement devices, etc., which, as sensors, record the corresponding process variables, fill level, flow rate, pressure, and temperature.

A variety of such field devices are manufactured and marketed by the Endress+Hauser company.

One important class of field devices consists of radar-based fill level measuring devices that are based upon the principle of pulse correlation radar. In such fill level measuring devices, the generating of radar pulses within the transmission path is controlled by means of a first pulse repetition frequency signal, whereas the local oscillator needed for the analysis of the reception signal is controlled by a second pulse repetition frequency signal, whose frequency differs slightly from the frequency of the first pulse repetition frequency signal.

The invention is based upon the objective of providing a frequency generator and a method for generating pulse repetition frequency signals for a radar measuring device functioning according to the pulse correlation principle, which generator and method would supply the required pulse repetition frequency signals with high precision.

These objectives are met by the characteristics specified in claims 1, 8, 10, 13, and 14.

Advantageous further developments of the invention are specified in the dependent claims. A frequency generator according to the embodiments of the present invention serves the purpose of generating two pulse repetition frequency signals with slightly different frequencies for use in a radar measuring device that functions according to the pulse correlation principle. The frequency generator comprises an oscillator, which generates an oscillator signal, a first signal path for generating a first pulse repetition frequency signal from the oscillator signal, and a second signal path for generating a second pulse repetition frequency signal from the oscillator signal.

The first signal path comprises a frequency divider or a first DDS module which is designed to generate a first frequency signal on the basis of the oscillator signal, a first mixer which is designed to upmix the first frequency signal or a signal derived therefrom to an intermediate frequency band and to generate a first intermediate frequency signal, and a first ceramic bandpass filter which is designed to filter out a selected frequency component of the first intermediate frequency signal and to generate a bandpass-filtered first intermediate frequency signal.

The second signal path comprises a second DDS component which is designed to generate a second frequency signal on the basis of the oscillator signal—said second frequency signal differing from the first frequency signal by a specified frequency offset—a second mixer which is designed to upmix the second frequency signal or a signal derived therefrom to an intermediate frequency band and to generate a second intermediate frequency signal, and a second ceramic bandpass filter which is designed to filter out a selected frequency component of the second intermediate frequency signal and to generate a bandpass-filtered second intermediate frequency signal.

By using a DDS module in the second signal path, the frequency offset between the first frequency signal and the second frequency signal can be set with extremely high precision. In order for the DDS module to be able to supply an output signal of high quality, the clock frequency of the DDS module must be at least 10 times higher than the frequency of the signal generated by the DDS module. The frequencies of the first and second frequency signals are, therefore, comparatively low and lie within the range of a few hundred kHz. Such frequencies are too low for the resulting frequency signals to be directly utilized as pulse repetition frequency signals for pulse correlation measurements, since the measurement speeds required by the application could not be reached in this way.

Therefore, it is recommended that the first frequency signal and the second frequency signal be upmixed by means of mixers to an intermediate frequency band of a higher frequency. This leads to the second advantage of inexpensive high-quality ceramic bandpass filters being available within the intermediate frequency band to which the frequency signals are upmixed, which bandpass filters can be used to filter out individual frequency components of the upmixed intermediate frequency signals. From the frequency components obtained in this way, the required pulse repetition frequency signals for the pulse correlation radar can then be derived.

In the following, the invention is outlined in more detail with the aid of exemplary embodiments depicted in the drawings. These show.

In distance measurement according to the pulse radar principle, a radar measuring device emits a pulse-like signal. This pulse-like radar signal reaches a radar target, from where it is reflected back to the radar measuring device, where it is analyzed. The distance of the radar target is given by the temporal offset between the emitted radar pulse and the received radar pulse.

Distance measurement by means of pulse radar is particularly suitable for determining the fill level of a medium in a container, such as, for example, in a tank. Pulse radar is, therefore, an important technology in the area of fill level measurement and is utilized in many measuring devices. Many field devices in the area of fill level measurement function according to the pulse radar principle.

Figure 1:
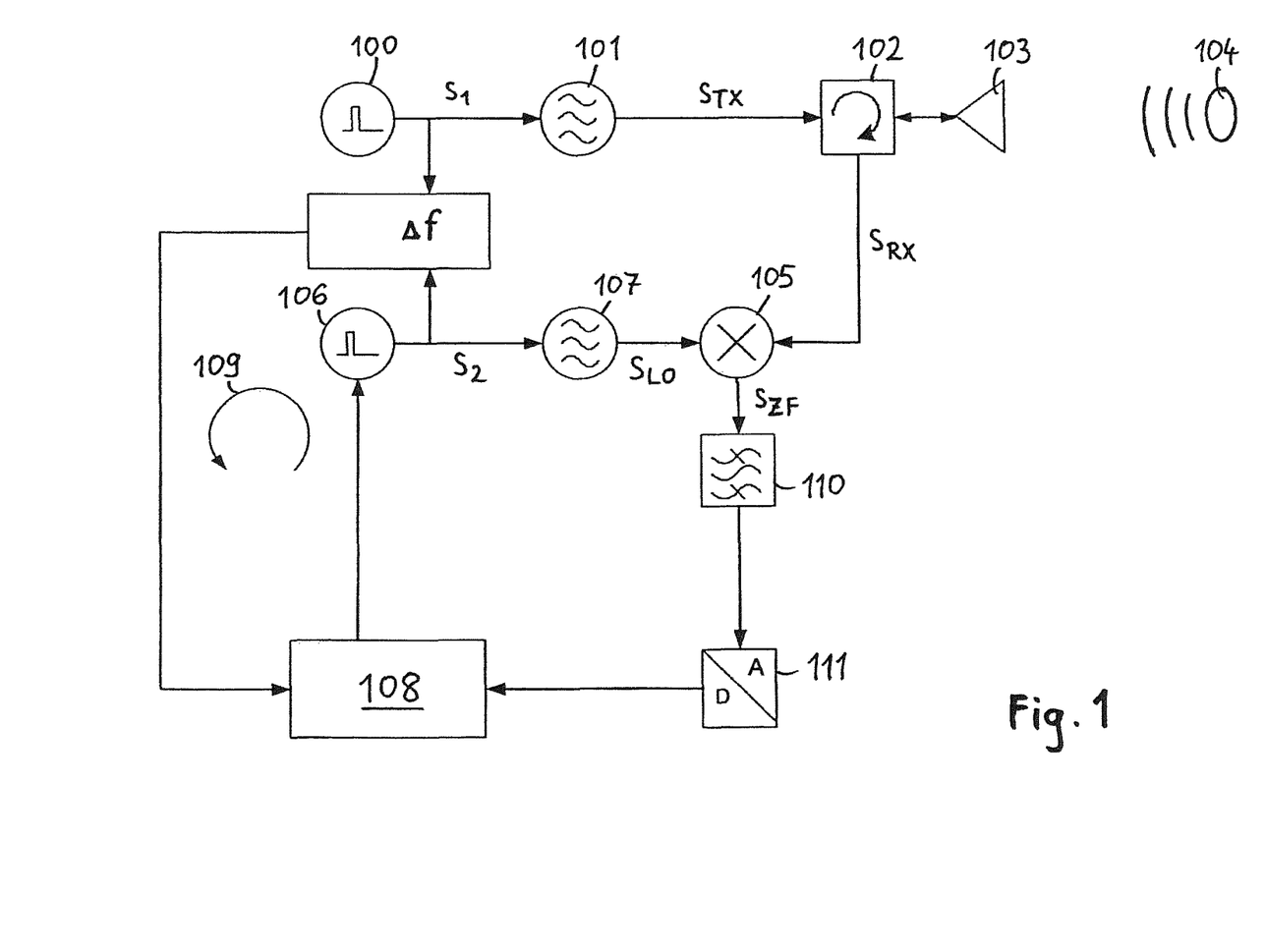
FIG. 1 a block diagram of a radar measuring device that functions according to the principle of pulse correlation radar.

With radar measuring devices that function according to the pulse radar principle, the focus of interest rests upon a solution where the radar transmission oscillator and the local oscillator are operated with pulse repetition frequencies that have a slight frequency offset in relation to each other. FIG. 1 shows a radar measuring device that functions according to the pulse correlation radar principle and that comprises two oscillators whose frequencies are slightly offset against each other. The PRF generator 100 specifies the pulse repetition frequency in the transmission path. The abbreviation "PRF" stands for "Pulse Repetition Frequency." The PRF generator 100 generates a string of square pulses with a frequency of approx. 1.8 to 2 MHz. The first PRF signal $s_1$ generated in this manner serves the purpose of controlling the radar transmission oscillator 101, which generates the actual radar signal with a radar frequency of, for example, 26 GHz. The radar transmission oscillator 101 is switched on and off in accordance with the first PRF signal $s_1$, which in turn leads to the generation of the pulse-like radar signal six. The pulse-like radar signal $s_{TX}$ is provided via an emitter/receiver switch 102 to the antenna 103 and then radiated by the antenna 103. The string of radar pulses radiated by the antenna 103 is reflected by a radar target 104, and the reflected radar pulses are in turn received by the antenna 103. Via the emitter/receiver switch 102, the pulse-like radar reception signal $s_{RX}$ is provided to the receiving mixer 105. Due to the signal propagation delay from the antenna 103 to the radar target 104 and back to the antenna 103, the radar pulses of the radar reception signal $s_{RX}$ have a certain time-delay in relation to the pulses of the emitted radar signal $s_{TX}$.

In order to determine this time-delay, characteristic for the target distance, the pulsed radar reception signal $s_{RX}$ is mixed with a pulsed local oscillator signal $s_{LO}$ in the receiving mixer 105. The pulse repetition frequency $f_2$ of the pulsed local oscillator signal $s_{LO}$ is specified by the second PRF signal $s_2$, which is generated by the PRF generator 106. The local oscillator 107 generates the pulsed local oscillator signal $s_{LO}$, which is generated according to the second PRF signal $s_2$ and provided to the receiving mixer 105. The pulse repetition frequency $f_2$ of the second PRF signal $s_2$ is thereby slightly different from the pulse repetition frequency $f_1$ of the first PRF signal $s_1$. The PRF generator 100 in the transmission path and the PRF generator 106 in the analysis path are regulated such that the pulse repetition frequency signal $f_2$ of the second PRF signal $s_2$ differs slightly from the pulse repetition frequency $f_1$ of the first PRF signal $s_1$ by a specified frequency offset $\Delta f$. The difference frequency $\Delta f$ is captured and provided to the control/regulating unit 108. Depending upon the difference frequency $\Delta f$, the control/regulating unit 108 adjusts the frequency of the PRF generator 106 in such a way as to achieve a specified frequency offset.

Due to the difference frequency $\Delta f$, the pulses of the local oscillator signal move with a certain speed relative to the pulses of the transmission signal $s_{TX}$ and also, accordingly, relative to the pulses of the reception signal $s_{RX}$. The bigger the selected frequency offset $\Delta f$, the stronger the pulses of the local oscillator shift relative to the pulses of $s_{TX}$ and $s_{RX}$. During each interval period of the pulse repetition frequency $f_1$, the local oscillator pulse shifts by $\Delta_T$ relative to the radar transmission oscillator pulse, wherein $\Delta_T$ depends upon the pulse repetition frequencies $f_1$ and $f_2$ in the following way: $\Delta_T=|T_2-T_1|=|1/f_2-1/f_1|$. Herein, $T_1$ designates an interval period of the reception signal, and $T_2$ designates an interval period of the local oscillator signal.

The analysis of the reception signal $s_{RX}$ is performed in the receiving mixer 105. There, the pulsed reception signal $s_{RX}$ is mixed with the local oscillator signal $s_{LO}$, so that, as a result, the intermediate frequency signal $s_{ZF}$ is obtained at the output of the receiving mixer 105. The intermediate frequency signal $s_{ZF}$ is filtered by an intermediate frequency filter 110 and subsequently converted into a digital signal via an analog-to-digital converter 111, which digital signal is provided to the control/regulating unit 108 for further analysis. When a pulse of the reception signal $s_{RX}$ reaches the receiving mixer 105 and, simultaneously, a pulse of the local oscillator signal $s_{LO}$ reaches it as well, this results in a corresponding deflection in the intermediate frequency signal $s_{ZF}$. In this way, the time-related position of the pulse in the reception signal $s_{RX}$ can be determined.

Figure 2:
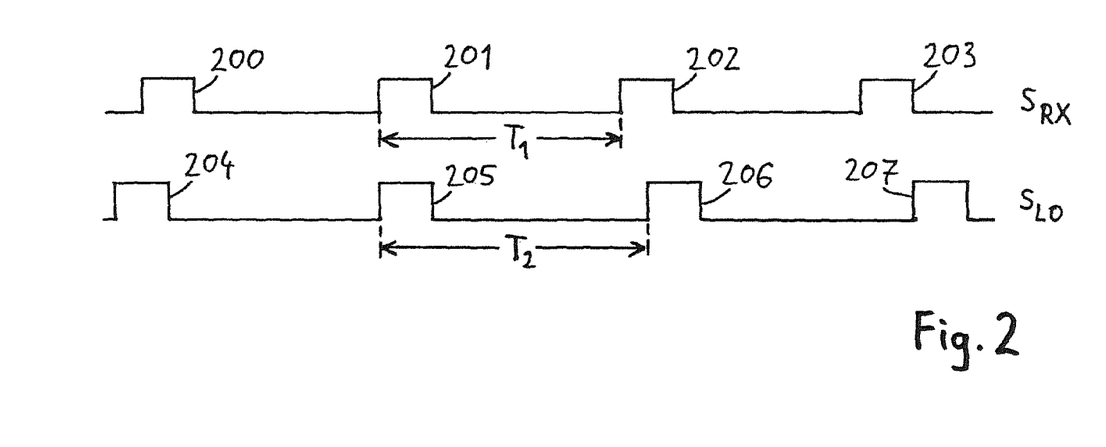
FIG. 2 the pulses of the reception signal $s_{RX}$ and the pulses of the local oscillator signal $s_{LO}$, wherein the local oscillator signal has a certain frequency offset in relation to the reception signal.

FIG. 2 shows how this is achieved. In the upper section of FIG. 2, the pulsed reception signal $s_{RX}$ is depicted as a function of time. The distance between the pulses 200, 201, 202, 203 of the reception signal is specified by the interval period $T_1=1/f_1$ in the transmission path. Below the reception signal $s_{RX}$, the pulsed local oscillator signal $s_{LO}$ is depicted in FIG. 2, which local oscillator signal is used for scanning the pulsed reception signal $s_{RX}$. Because the pulse repetition frequency $f_2$ in the local oscillator path is slightly lower than the pulse repetition frequency $f_1$ in the transmission path, the interval period $T_2$ of the local oscillator signal $s_{LO}$ is slightly bigger than the interval period T1 of the reception signal $s_{RX}$, the pulses 204 through 207 of the local oscillator signal keep shifting farther to the right relative to the pulses 200 through 203 of the reception signal $s_{RX}$. With every interval period of the local oscillator signal $s_{LO}$, the pulse of the local oscillator signal $s_{LO}$ shifts to the right by a time increment $\Delta_T$ relative to the pulses of the reception signal $s_{RX}$. This enables a scanning of the time-related pulse position of the reception signal $s_{RX}$.

Due to the different interval periods of the reception signal $s_{RX}$ and the local oscillator signal $s_{LO}$, the time-related position of the received pulses can gradually be scanned by the local oscillator pulses. Thus, the frequency offset $\Delta f$ enables a gradual scanning of the time-related position of the reception signal pulses by the local oscillator pulses. The correlation between the two pulses is indicated by the intermediate frequency signal $s_{ZF}$ that is provided at the output of the receiving mixer. For a precise determination of the reception signal pulse position, and hence of the run time, it is important that the frequency offset $\Delta f$ be selected to be very small and maintained with high precision, in order to enable a finely screened scanning of the time-related position of the received pulses. While the pulse repetition frequency for the transmission signal typically lies within the range of approx. 1.8 to 2 MHz, the frequency difference $\Delta f$ amounts only to approx. 10 Hz. This puts very high demands upon the PRF generators of the transmission signal and the local oscillator signal.

For generating the two PRF signals with sufficiently high precision, it is recommended that one or more direct digital synthesizer modules (DDS) be utilized for generating the frequencies. The direct digital synthesis (DDS) is a method of digital signal processing for generating periodic signals, whose frequency can be set with an extremely precise frequency resolution.

Figure 3:
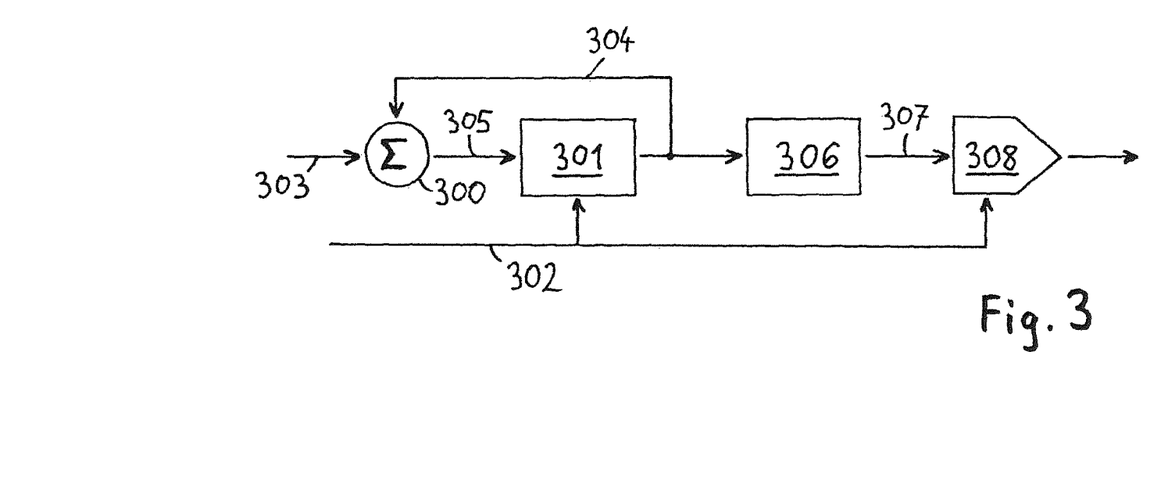
FIG. 3 the structure of a DDS (Direct Digital Synthesizer) module.

In FIG. 3, the structure of a DDS module is shown in a schematic representation. The DDS module comprises a digital adder 300 and a phase register 301, in which the current phase value is stored. The DDS module is clocked by a clock signal 302. In the digital adder 300, during every cycle step a specified phase increment 303 is added to the phase value 304, which has been read from the phase register 301. As a result of this addition, the digital adder 300 writes a new phase value 305 to the phase register 301. The actual phase value stored in the phase register 301 corresponds to a phase angle, and the overflow of the phase register 301 (automatic return to 0) corresponds to a full cycle of the phase register of $2\pi$. The signal value corresponding to a certain phase value is generated by the phase-to-amplitude converter 306. The conversion of the phase value to a corresponding amplitude can be performed by means of, for example, a ROM table or determined algorithmically in relation to the run time. The signal value 307 obtained at the output of the phase-to-amplitude converter 306 is converted by the digital-to-analog converter 308 into an analog signal value. Given the specified clock signal 302, the frequency of the DDS signal 309 generated in this way can be set with high precision by using the corresponding selection of the phase increment 303.

With digital generation of signals in high frequency resolution by means of DDS modules, interference signals emerge due to time and amplitude quantization, which interference signals depend upon the bit width of the DDS functional blocks (e.g., phase register and digital-to-analog converter) and the clock frequency to desired output frequency ratio. Generally, the principle applies that the higher the ratio between clock frequency and desired output frequency and the bigger the bit width, the smaller the expected interferences, wherein the frequency ratio is the more decisive factor.

Figure 4:
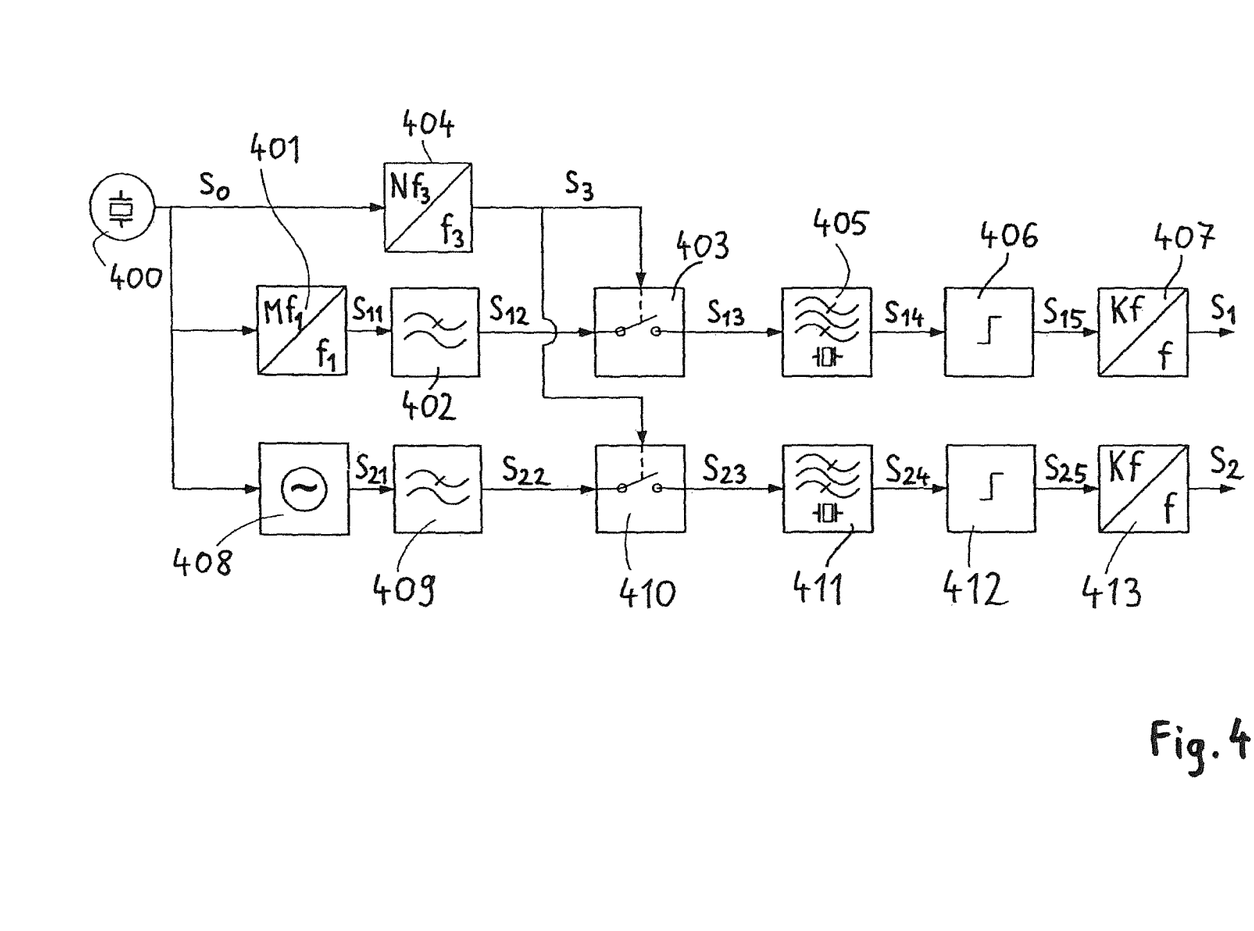
FIG. 4 a block diagram of a frequency generator, which generates a first PRF signal for the radar transmission oscillator and a second PRF signal for the local oscillator.

FIG. 4 shows a frequency generator for generating pulse repetition frequencies that are slightly offset against each other. Such a frequency generator can, for example, be used in a radar measuring device that functions according to the pulse correlation principle. The frequency generator comprises a crystal oscillator 400, which provides an oscillator signal $s_0$, which serves as the basis for generating the two PRF signals that are slightly offset against each other. The frequency of the oscillator signal $s_0$ can be, for example, on the scale of 25 MHz. The frequency generator shown in FIG. 4 comprises a first signal path for generating a first PRF signal $s_1$, which controls the pulsed operation of the radar transmission oscillator, and a second signal path for generating a second PRF signal $s_2$, which controls the pulsed operation of the local oscillator.

In the first signal path, the oscillator signal $s_0$ is first provided to a frequency divider 401. The frequency divider 401 is designed to divide the frequency $f_0$ of the oscillator signal $s_0$ down according to a division ratio M to a frequency $f_1=f_0/M$. The signal $s_{11}$ received at the output of the frequency divider 401 is then provided to a low-pass 402, which serves the purpose of filtering away the harmonic frequency components contained in the spectrum of the signal $s_{11}$, so that the signal $s_{12}$ received at the output of the low-pass 402 has only spectral components of the base frequency $f_1$. The signal $s_{12}$ is provided to the mixer 403, which is designed to upmix the signal $s_{12}$ to an intermediate frequency band. For this purpose, based upon the oscillator signal $s_0$, a suitable mixer signal $s_3$ is generated with the help of the frequency divider 404. The frequency divider 404 divides the frequency $f_0$ of the oscillator signal $s_0$ down according to a division ratio N to a frequency $f_3=f_0/N$. The signal obtained in this way is provided to the mixer 403 as mixer signal $s_3$ with the frequency $f_3$.

The mixer 403 can, for example, be realized as a switch-based double side band mixer, wherein the switches of the mixer 403 are switched according to the clock frequency $f_3$ that is specified by the mixer signal $s_3$. The switches of the mixer 403 can be realized as CMOS switches, for example. At the output of the mixer 403, an upmixed signal $s_{13}$ is obtained, which contains frequency components of the frequencies $f_3-f_1$ and $f_3+f_1$. This upmixed signal $s_{13}$ is now provided to the bandpass filter 405, which suppresses one of these spectral components and allows the other one to pass through. Thus, by means of the switch-based mixer 403, along with the bandpass filter 405, a single sideband mix can easily be achieved.

The bandpass filter 405 is, preferably, a ceramic bandpass filter. Such filter components are being produced in high quantities, e.g., for broadcasting technology, and hence are available with selected intermediate frequencies at an inexpensive price. Due to the high quality of ceramic bandpass filters, such filters are optimally suitable for filtering out selected frequency components. Therefore, ceramic bandpass filters have the required frequency selectivity for realization of an ideal single sideband implementation. Preferably, the intermediate frequency range of the frequency generator shown in FIG. 4 is selected at such high frequencies that filtering out individual frequency components by means of the ceramic filter components described above can be performed.

At the output of bandpass filter 405, the bandpass-filtered signal $s_{14}$ is obtained. This signal, which contains only a single intermediate frequency component, is provided to a comparator 406, which comparator converts the signal $s_{14}$ into a square wave signal $s_{15}$. Subsequently, the square wave signal $s_{15}$ obtained in this way can optionally be divided down to a desired frequency by a final frequency divider 407, so that the desired PFR signal $s_1$ for controlling the pulse generation of the radar transmission oscillator is obtained. Such a final frequency divider 407 is required in cases where the intermediate frequency range of the ceramic bandpass filter 405 used differs from the frequency of the desired PRF signal $s_1$.

In addition to that, the frequency generator shown in FIG. 4 comprises a second signal path that serves the purpose of generating a second PRF signal $s_2$ for controlling the local oscillator, which second PRF signal has a frequency that is slightly offset in relation to the first PRF signal $s_1$. In order to be able to precisely set the frequency offset $\Delta f$ in relation to the first signal path, the second signal path comprises a DDS (Direct Digital Synthesis) module 408, which receives the oscillator signal $s_0$ as a clock signal. The DDS module 408 is configured such that it generates a signal $s_{21}$, whose frequency $f_2$ differs from the frequency $f_1$ of the signal $s_{11}$ by a specified slight frequency offset $\Delta f$. Therefore, the frequency $f_2$ of the signal $s_{21}$ is part of the following equation: $|f_2-f_1|=\Delta f$.

The signal $s_{21}$ supplied by the DDS module 408 is then provided to the low-pass filter 409, which is designed to filter out harmonic components of the base frequency, as well as high-frequency image frequency components of the signal $s_{21}$. The low-pass filtered signal $s_{22}$ obtained in this way is subsequently provided to the mixer 410, which is again preferably realized as a switch-based mixer. The signal $s_3$ with the frequency $f_3$ that is provided by the frequency divider 404 is again used as mixer signal. The mixer 410 is designed to upmix the signal $s_{22}$ with a comparatively low frequency to the intermediate frequency band with a higher frequency. The upmixed signal $s_{23}$ comprises a frequency component at a frequency $f_3-f_2$ as well as a frequency component at a frequency $f_3+f_2$. The bandpass filter 411 suppresses one of these two frequency components, so that the signal $s_{24}$ at the output of the bandpass 411 has only a single frequency component. Preferably, the bandpass filter

411, just as the bandpass filter 405, is designed as a ceramic bandpass filter of high quality, so that it enables selective filtering out of a certain frequency component. The signal $s_{24}$ is converted into a square wave signal $s_{25}$ by the comparator 412. Finally, the frequency of the square wave signal $s_{25}$ is divided down by the final frequency divider 413 to such a degree that the second PRF signal $s_2$ obtained in this way can be used as control signal for the pulsed operation of the local oscillator.

In the following, a concrete design of the frequency generator shown in FIG. 4 is described. The crystal oscillator 400, for example, can be operated with a frequency $f_0=25$ MHz. This has the advantage that the power consumption of the crystal oscillator 400 at this frequency is relatively low. If the crystal oscillator 400 were to be operated at a higher frequency, the power consumption would rise respectively and would lead, particularly with field devices, to higher power consumption. The frequency divider 401 in the first signal path, for example, divides the oscillator frequency $f_0$ at a ratio M=42, so that a signal $s_{11}$ is obtained that has been divided down and has a comparatively low frequency of $f_1=595.238$ kHz. The DDS module 408 is configured such that it generates a signal $s_{21}$ with a frequency $f_2=595.370$ kHz, which is offset in relation to $f_1$ by $\Delta f=132$ Hz. The two frequencies $f_1$ and $f_2$ are very close to each other. Due to the fact that the clock frequency $f_0$ of the DDS module 408 is at least 10 times higher than the frequency $f_2$ of the generated signal $s_{21}$, only minor interferences occur at the frequency synthesis.

However, the two frequencies $f_1=595.238$ kHz and $f_2=595.370$ kHz are too low to be suitable for use as PRF signals. For this reason, they are upmixed to an intermediate frequency band by the mixers 403, 410. The mixer signal is generated by the frequency divider 404, which works with a division ratio of N=2, and supplies the mixer signal $s_3$ at the frequency $f_3=12.5$ MHz. In the first signal path, the signal $s_{12}$ at $f_1=595.238$ kHz is upmixed to the intermediate frequency band by the mixer signal $f_3=12.5$ MHz, wherein a first frequency component at $f_3-f_1=11.904762$ MHz and a second frequency component at $f_3+f_1=13.095238$ MHz are generated. For this frequency range, ceramic bandpass filters of a sufficiently high quality and selectivity are provided, so that the first frequency component at 11.904762 MHz can be filtered out selectively by a ceramic bandpass filter. For this, for example, a ceramic bandpass filter with a center frequency of 12 MHz can be used, whose pass bandwidth ranges from 11.9 MHz to 12.1 MHz. In the second signal path, the signal $s_{22}$ at the frequency $f_2=595.370$ kHz is upmixed into the intermediate frequency range by the mixer signal $f_3=12.5$ MHz, wherein frequency components $f_3-f_2=11.904630$ MHz and $f_3+f_2=13.095370$ MHz are generated. The frequency component at 11.904630 MHz is selectively filtered out by a ceramic bandpass filter, whereas the higher frequency component is suppressed. For this, just as in the first signal path, a ceramic bandpass filter with a center frequency of 12 MHz and a passband width of 11.9 MHz to 12.1 MHz can be used.

In the first signal path, as well as in the second signal path, the intermediate frequency range is set at comparatively high frequencies of approx. 12 MHz. For this reason, the signals $s_{14}$ and $s_{24}$ that are obtained at the output of the ceramic bandpass filters 405 and 411, respectively, usually have a frequency that is too high to be utilized as PRF signals for controlling the radar transmission oscillator or the local oscillator. Thus, in the first signal path, downstream of the ceramic bandpass filter 405 and the comparator 406, a final frequency divider 407 is arranged, which divides the intermediate frequency signal at the division ratio K=6. By this, the intermediate frequency signal $s_{15}$, which has a frequency of 11.904762, is converted into the desired first PFR signal $s_1$, which has a frequency of 1.984127 MHz. The first PRF signal $s_1$ generated in this way can be used directly for controlling the pulse operation of the radar transmission oscillator.

In the same way, in the second signal path, downstream of the ceramic bandpass filter 411 and the comparator 412, a final frequency divider 413 is arranged, which divides the intermediate frequency signal according to the division ratio K=6. In this way, the intermediate frequency signal $s_{25}$, which has a frequency of 11.904630, is converted into the desired first PRF signal $s_2$, which has a frequency of 1.984105 MHz. The PRF signal $s_2$ generated in this way can be used directly for controlling the pulse operation of the local oscillator.

In the case of the described frequency range design of the frequency generator shown in FIG. 4, between the PRF signal $s_1$ with a frequency of 1.984127 MHz and the PRF signal $s_2$ with a frequency of 1.984105 MHz, a frequency offset of $\Delta f=22$ Hz results. By using the DDS module 408, this frequency offset of $\Delta f=22$ Hz between the signals $s_1$ and $s_2$ can be maintained with high precision. Therefore, the PRF signals $s_1$ and $s_2$ are suitable for a sufficiently precise signal analysis with pulse correlation radar.

In the following, the different decisive criteria required for the design of the frequency generator shown in FIG. 4 are summarized again:

1. The frequency $f_0$ of the crystal oscillator 400 should not be selected to be too high, so that power consumption of the radar measuring device is not too high.
2. The clock frequency of the DDS module 408 should be significantly higher than the frequency of the output signal $s_{21}$. Preferably, the clock frequency of the DDS module 408 should be at least ten times higher than the frequency of the desired output signal $s_{21}$. Only then can it be ensured that a sufficiently interference-free output signal $s_{21}$ is obtained.
3. It follows from point 1 and point 2 that at the output of the DDS module 408, an output signal $s_{21}$ with a comparatively low frequency of a few hundred kilohertz is obtained. Therefore, the signal $s_{21}$ cannot be used directly as PFR signal for controlling the pulse operation of a radar transmission oscillator, but has to be first transformed to a higher frequency range. In the case of the embodiment shown in FIG. 4, this is performed by mixers 403, 410, which convert the signals $s_{11}$ and $s_{21}$ into an intermediate frequency band with a higher frequency.
4. The intermediate frequency band, to which the signals $s_{11}$ and $s_{21}$ are to be upmixed, should preferably be in a frequency range, for which there are ceramic bandpass filters of high quality provided, which can filter out unwanted frequency components. Preferably, an intermediate frequency band in the frequency range of approx. 10-12 MHz is selected, since, for this frequency range, ceramic bandpass filters of high quality exist.
5. The signals that have been upmixed to the intermediate frequency bandtypically have a frequency that is too high for them to be used directly as PRF signals for controlling radar pulse generation. Therefore, it is usually necessary to provide further frequency dividers, in order to divide down the signals from the intermediate frequency band to a frequency range suitable for PRF signals, so as in this way to obtain PRF signals with a desired frequency in the range of, for example, 2 MHz.

Figures 5A, 5B, 5C, 5D, 5E, 5F:
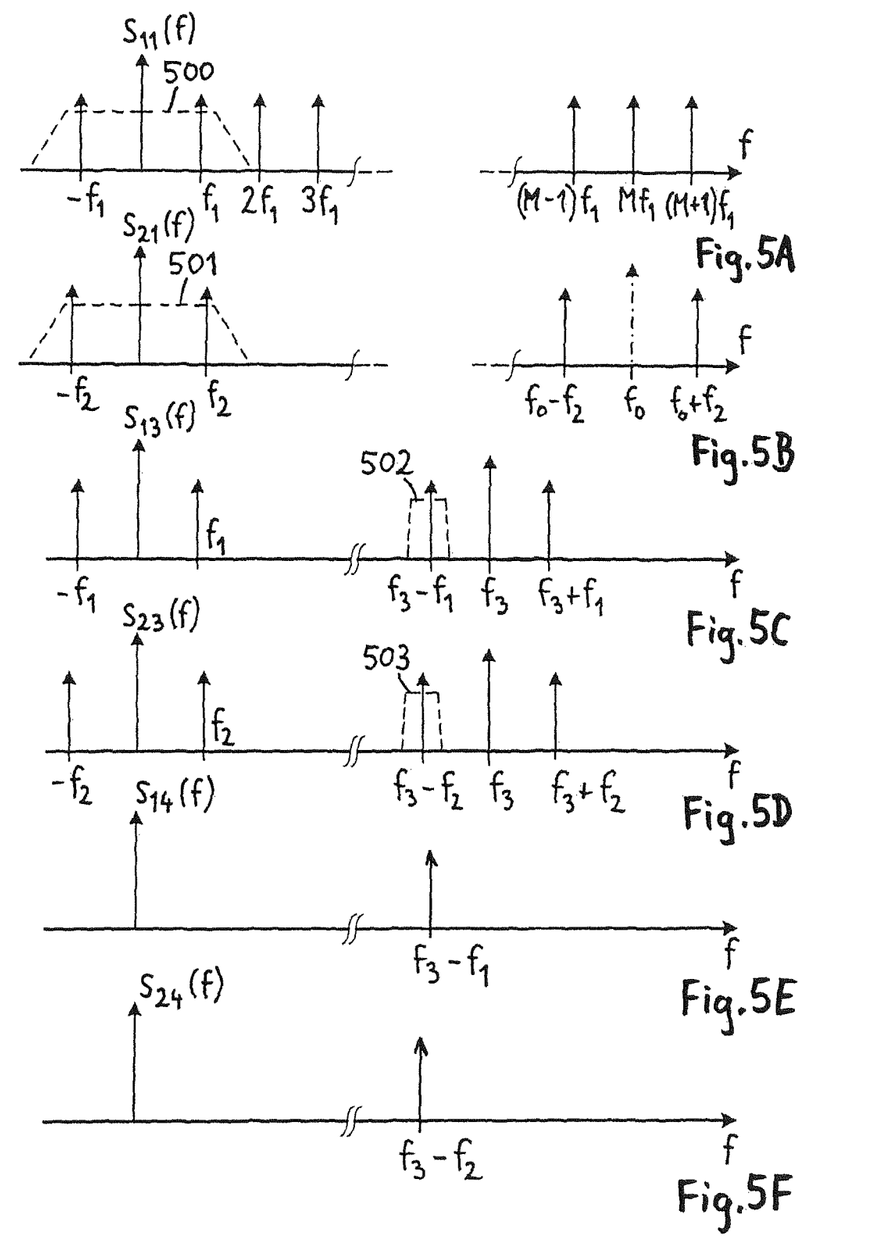
FIGS. 5A-5F an overview of the different frequency components of the signals of the frequency generator from FIG. 4.

In FIG. 5A through FIG. 5F, an overview of the signals generated in the frequency generator of FIG. 4, with their different frequency components, is depicted. FIG. 5A shows the frequency components in the signal $s_{11}$ that is present at the output of the frequency divider 401. The signal $s_{11}$ comprises the frequency components at $-f_1$ and $f_1$. This is due to the fact that the real-valued signal $s_{11}$ may be expressed as a sum of two complex-valued components at $-f_1$ and $f_1$. In addition to that, the signal $s_1$, comprises harmonic signal components at $2f_1$, $3f_1$, ... $(M-1)f_1$, $Mf_1$, $(M+1)f_1$, ..., etc. The low-pass 402 shown in FIG. 4 filters away these harmonic signal components; only the frequency components at $-f_1$ and $f_1$ can pass through. In FIG. 5A, the filter characteristic 500 of the low-pass filter 402 is represented by a dashed line. At the output of the low-pass filter 402, the low-pass filtered signal $s_{12}$ is obtained that now comprises the frequency components at $-f_1$ and $f_1$.

FIG. 5B shows the frequency components of the signal $s_{21}$, which is present in the second signal path at the output of the DDS module 408. The signal $s_{21}$ comprises frequency components at the frequency $f_2$ generated in the DDS module 408, as well as at $-f_2$. In addition to that, the signal $s_{21}$ comprises image frequency components at $f_0-f_2$ and $f_0+f_2$, wherein $f_0$ represents the clock frequency provided by the crystal oscillator 400, which is used to operate the DDS module 408. The low-pass filter 409 shown in FIG. 4 is designed to filter away the image frequency components at $f_0-f_2$ and $f_0+f_2$ and to let only the signal components at $-f_2$ and $f_2$ pass through. The filter characteristic 501 of the low-pass filter 409 is represented by a dashed line in FIG. 5B. At the output of the low-pass filter 409, the signal $s_{22}$ is obtained that now comprises only the frequency components at $-f_2$ and $f_2$.

Subsequently, the signals 512 and 522 are upmixed by means of the mixer frequency $f_3$ into the intermediate frequency band. In the first signal path, a mixer 403 is provided for upmixing the signal $s_{12}$. In FIG. 5C, the frequency components of the signal $s_{13}$ are shown, which signal is present at the output of the mixer 403. As can be seen in FIG. 5C, the signal $s_{13}$ contains upmixed signal components at $f_3-f_1$, at $f_3$, and at $f_3+f_1$. In addition to that, the signal $s_{13}$ also comprises the frequency components at $-f_1$ and $f_1$. In the first signal path, the ceramic bandpass filter 405 is provided, which is designed to allow the frequency component at $f_3-f_1=11.904762$ MHz to pass through and to filter away all other frequency components. For this purpose, the ceramic bandpass filter is designed with regard to its center frequency and its pass band such that it allows the frequency component at $f_3-f_1$ to pass, while filtering out all other frequency components. The filter characteristic 502 of the ceramic bandpass filter 405 required for this is represented by a dashed line in FIG. 5C. At the output of the ceramic bandpass filter 405, the signal $s_{14}$ is obtained that now comprises only the frequency component at $f_{341}$. The signal $s_{14}$ with its frequency component at $f_3-f_1$ is shown in FIG. 5E. From this signal $s_{12}$, the desired PRF signal $s_1$ for the radar transmission oscillator can be derived by means of a further frequency division.

In the second signal path, the low-pass filtered signal $s_{22}$ is upmixed by the mixer 410 to the intermediate frequency band, wherein the signal $s_3$ at frequency $f_3$ is used as the mixer signal. In FIG. 5D, the frequency components of the signal $s_{23}$ are shown, which is present at the output of the mixer 410. The signal $s_{23}$ comprises upmixed frequency components at $f_3-f_2$, at $f_3$, at $f_3+f_2$, as well as at $-f_2$ and $f_2$. By means of the ceramic bandpass filter 411, the frequency component at $f_3-f_2$ is filtered out, whereas all the other frequency components are suppressed. The filter characteristic 503 of the bandpass filter 411 is represented by a dashed line in FIG. 5D. At the output of the bandpass filter 411, the signal $s_{24}$ is obtained, which comprises only a single frequency component at the frequency $f_3-f_2$. This signal $s_{24}$ is shown in FIG. 5F. From this signal $s_{24}$, the desired PRF signal $s_2$ for the local oscillator can be derived by means of a further frequency division.

Figure 6:
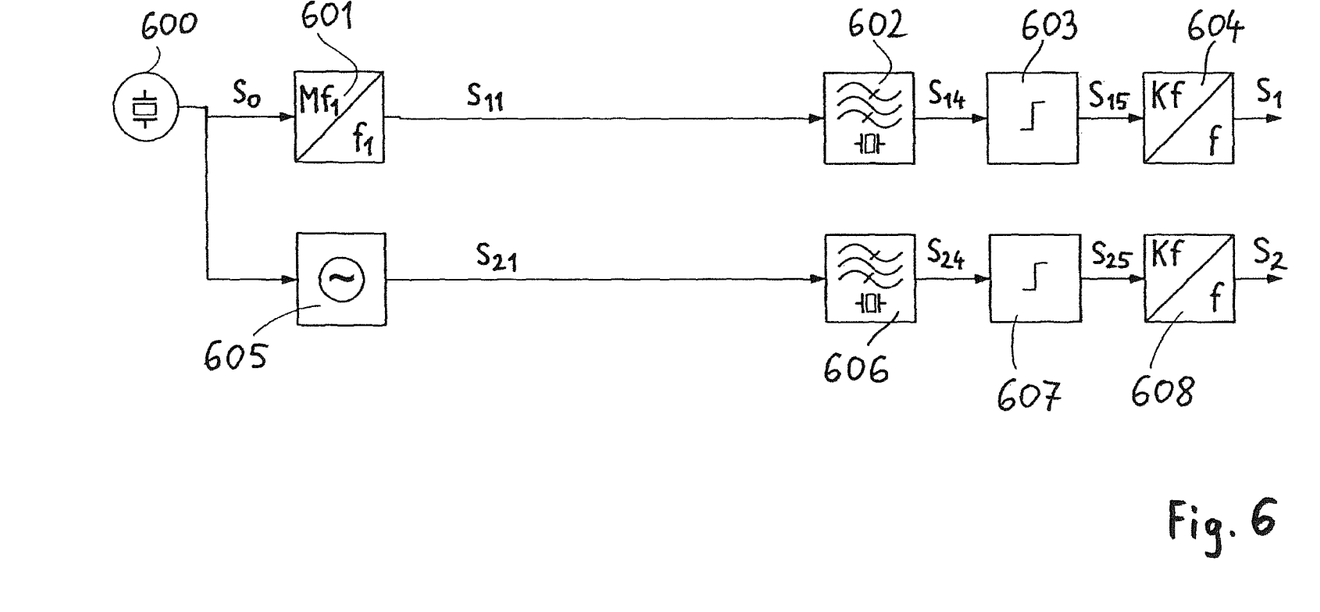
FIG. 6 a further block diagram of a frequency generator, which generates a first PRF signal for the radar transmission oscillator and a second PRF signal for the local oscillator.

In FIG. 6, an alternative embodiment for a frequency generator is shown in the form of a block diagram. The frequency generator shown in FIG. 6 is also able to generate a first PRF signal $s_1$ for controlling the pulsed operation of the transmission oscillator, as well as a slightly frequency-shifted, relative to second PRF signal $s_2$ for controlling the pulsed operation of the local oscillator. As a comparison between FIG. 6 and FIG. 4 reveals, the frequency generator shown in FIG. 6 has a significantly reduced circuitry. In particular, the mixers 403 and 410, as well as the low-pass filters 402 and 409 arranged upstream, are left out of the frequency generator shown in FIG. 6.

The frequency generator shown in FIG. 6 comprises a crystal oscillator 600, which provides an oscillator signal $s_0$ with a frequency $f_0=12.5$ MHz. This oscillator frequency $f_0=12.5$ MHz differs from the oscillator frequency used in FIG. 4 in that, with the embodiment shown in FIG. 6, the oscillator frequency used must be aligned to the pass band of the available bandpass filters. The first signal path comprises a frequency divider 601, which divides the oscillator signal so according to a division ratio M, wherein the division ratio can be selected to be M=21, for example. At the output of the frequency divider 601, the signal $s_{11}$ is obtained at a base frequency of, for example, 595.238 KHz. In contrast to FIG. 4, the first signal path shown in FIG. 6 does not comprise a low-pass filter or a mixer, which would upmix the signal $s_{11}$ to an intermediate frequency band. Instead, the solution shown in FIG. 6 takes advantage of the fact that the signal $s_{11}$ also comprises frequency components at harmonics of the base frequency, in addition to the base frequency at 595.238 KHz itself. One of these high frequency harmonics of the signal $s_{11}$ is filtered out by the ceramic bandpass filter 602, whereas the rest of the frequency components is filtered away. By such means, an intermediate frequency signal $s_{14}$ is obtained at the output of the bandpass filter 602 that comprises only a single frequency component. The ceramic bandpass filter 602 can be designed, for example, to filter out the harmonic at $(M-1)$ $f_1=20 \cdot f_1=11.904762$ MHz. The comparator 603 arranged downstream converts the intermediate frequency signal $s_{14}$ into a square wave signal $s_{15}$, which is subsequently converted by means of the frequency divider 604 into a first PRF signal $s_1$ for the radar transmission oscillator. The division ratio K of the frequency divider 604 can thereby be selected, for example, to be K=6, so that the first PRF signal $s_1$ is obtained at a frequency of 1.984127 MHz.

The second signal path of the frequency generator shown in FIG. 6 comprises a DDS module 605 which receives the oscillator signal $s_0$ as clock signal. The DDS module 605 is configured such that it generates an output signal $s_{21}$ at a frequency of, for example, 595.370 KHz, which is offset in relation to the signal $s_{11}$ by a frequency offset of 132 Hz. Since the frequency of the oscillator signal is $f_0=12.5$ MHz, and thus much higher than the frequency of the signal $s_{21}$, the signal $s_{21}$ can be generated by the DDS module 605 with high precision and low interference. In order to raise the signal $s_{21}$ to the intermediate frequency range, the application takes advantage of the fact that, in addition to the base frequency $f_2=595.370$ KHz, the signal $s_{21}$ also has higher frequency image frequency components at $f_0-f_2$ and $f_0+f_2$. By means of the ceramic bandpass filter 606, one of these two image frequency components is allowed to pass—for example, the image frequency component at $f_0-f_2=11.904630$ MHz. The remaining frequency components of the signal $s_{21}$ are filtered away. The signal $524$, which is obtained at the output of the ceramic bandpass filter $606$, thus contains only a single frequency component at $f_0-f_2$. By means of the comparator $607$, the intermediate frequency signal $s_{24}$ is converted into a square wave signal $s_{25}$. Subsequently, the frequency of the square wave signal $s_{25}$ is divided by the frequency divider $608$ in a division ratio of, for example, K=6, so as to obtain the desired second PRF signal $s_2$ at a frequency of 1.984105 MHz. Thus, a frequency offset $\Delta f$ of 22 Hz between the PRF signals $s_1$ and $s_2$ results. While the first PRF signal $s_1$ controls the pulsed operation of the radar transmission oscillator, the second PRF signal $s_2$ serves to control the local oscillator.

In the case of the embodiment shown in FIG. 6, the oscillator frequency $f_0$ of 12.5 MHz differs by only approx. 595 kHz from the center frequency of the ceramic bandpass filter. Thus, for the embodiment shown in FIG. 6, a relatively rigid connection exists between the oscillator frequency, on the one hand, and the pass band of the ceramic bandpass filter, on the other. The oscillator frequency must be aligned to the pass band of the ceramic bandpass filter. If the oscillator frequency resulting from such an embodiment seems to be too low, there is, however, the possibility of providing an additional frequency divider between the oscillator $600$ and the DDS module $605$, which divides the oscillator frequency according to a specified ratio. In such a case, an oscillator frequency that is a multiple of the 12.5 MHz so far discussed can be used.

Figure 7A:
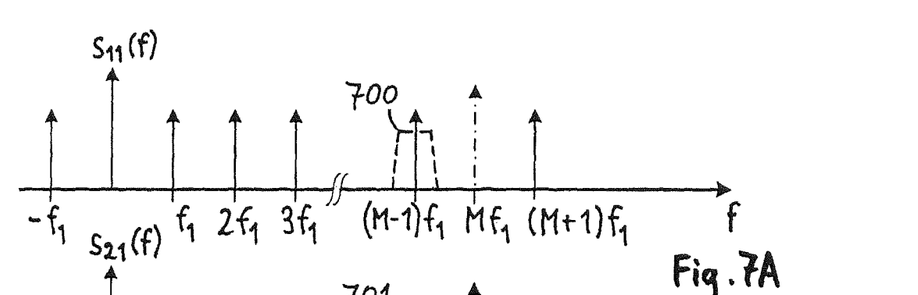
FIGS. 7A-7D an overview of the different frequency components of the signals of the frequency generator from FIG. 6.
Figure 7B:
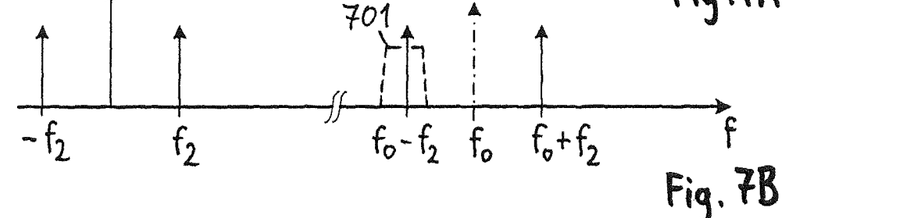
Figure 7C:
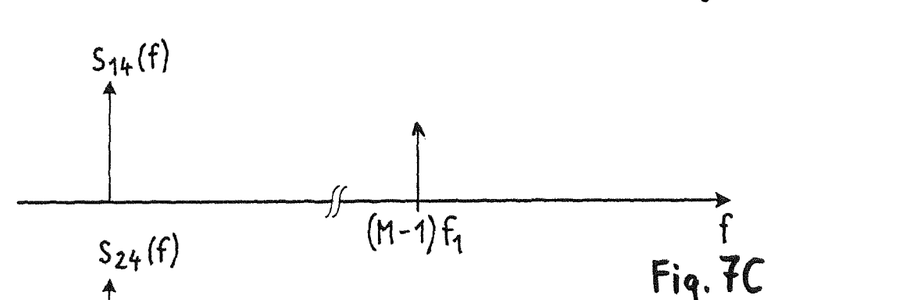

In FIG. 7A through FIG. 7D, the signals generated by the frequency generator from FIG. 6, with their different frequency components, are depicted. FIG. 7A shows the frequency components of the signal $s_{11}$, obtained at the output of the frequency divider $601$, which comprise the frequency components $f_1$ and $-f_1$ at the base frequency $f_1=595.238$ KHz, as well as the corresponding harmonics at $2f_1$, $3f_1$, ... $(M-1)f_1$, $Mf_1$, $(M+1)f_1$, ..., etc. By means of the ceramic bandpass filter $602$, the harmonic at $(M-1)f_1$ is allowed to pass, whereas all the other frequency components are filtered away. The filter characteristic $700$ of the bandpass filter $602$ is represented by a dashed line in FIG. 7A. Thus, at the output of the ceramic bandpass filter $602$, the signal $s_{14}$ is obtained that comprises only a single frequency component at the frequency $(M-1)f_1$. In FIG. 7C, the frequency components of the signal $s_{14}$ are shown. The signal $s_{14}$ has only a single frequency component at the harmonic $(M-1)f_1=11.904762$ MHz.

Figure 7D:
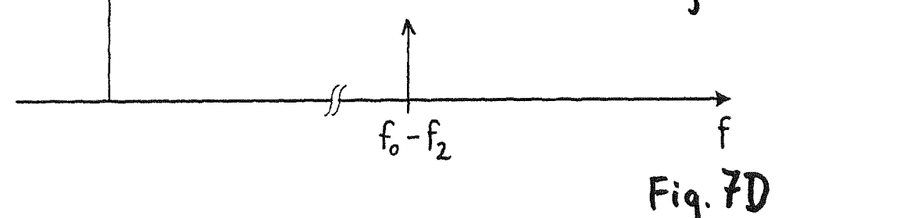

FIG. 7B shows the frequency components of the signal $s_{21}$ generated by the DDS module $605$. The signal components at $f_2=595.370$ KHz and at $42$ can be seen, as well as the image frequency components at $f_0-f_2$ and $f_0+f_2$, wherein $f_0$ designates the oscillator frequency of 12.5 MHz. The ceramic bandpass filter $606$ is designed to allow one of the two image frequency components to pass—for example, the image frequency component at $f_0-f_2=11.904630$ MHz—and to filter away the rest of the frequency components. The filter characteristic $701$ of the ceramic bandpass filter $606$ is represented by a dashed line in FIG. 7B. Thus, at the output of the ceramic bandpass filter $606$, the signal $s_{24}$ is obtained that comprises only a single frequency component at the frequency $f_0-f_2$. In FIG. 7D, the frequency components of the signal $s_{24}$ are shown. The signal $s_{24}$ has a single image frequency component at $f_0-f_2=11.904630$ MHz.

The embodiments of frequency generators shown in FIG. 4 and FIG. 6 each comprise a frequency divider in the first signal path and a DDS module in the second signal path. Alternatively, embodiments are possible that utilize a DDS module in both the first signal path and the second signal path. In FIG. 4, the frequency divider $401$ would thus be replaced by a DDS module, wherein the DDS module in the first signal path and the DDS module $408$ in the second signal path would each generate signals with a slight frequency offset against each other. Similarly, in the case of the embodiment shown in FIG. 6, it is also possible to use DDS modules in both signal paths. Instead of the frequency divider $601$, a DDS module would be used, wherein the DDS module in the first signal path of FIG. 6 would generate a frequency that would have a slight frequency offset in relation to the frequency generated by the DDS module $605$. The other signal processing stages shown in FIG. 4 and FIG. 6 remain unchanged. In particular, the signals generated by DDS modules could also be further processed by being elevated to an intermediate frequency band and subsequently filtered by means of a ceramic bandpass filter.

The programmability of the DDS module, in principal, enables a variation of the frequency difference $\Delta f$ between the PRF signal $s_1$ for the radar transmission oscillator and the PRF signal $s_2$ for the local oscillator during radar operation. Via the frequency difference $\Delta f$, the correlation speed at which the pulses of the reception signals are scanned can be varied. A small frequency difference leads to a low correlation speed and thus to a more precise scanning, whereas a bigger frequency difference enables a faster and less precise scanning of the received pulses. The alteration in correlation speed can, continuously or in stages, depending upon the respective application, be changed constantly, intermittently, or periodically.

A beneficial periodical change would be the lowering of the correlation speed during the recording of an envelope, so that a lower correlation speed would result for targets at a greater distance than for targets at a lesser distance. The reception power that is reflected back by a plain reflector diminishes as the distance to the target increases. A non-linear change in the correlation speed in accordance with the diminishing reception power corresponding to the target distance could thus be used for complete or partial compensation of the distance-dependence of the reception power.

At a low reflectivity of the filling material, a smaller difference frequency or a slower correlation speed can be selected that leads to a higher sensitivity as a result. This slower correlation speed could, for example, be limited to a small distance range around the echo. For example, the correlation speed could be particularly lowered in distance ranges involving separating layers or foam layers. A further beneficial application would be increasing the correlation speed and thus lowering the sensitivity in distance ranges that involve strong obstructions (clutter reduction).

Since changes in the frequency difference $\Delta f$ or in the correlation speed at otherwise unchanged parameters change the position and the duration of an intermediate frequency signal generated from a punctiform target, to be able to use this degree of freedom, the intermediate frequency filter $110$ would have to be designed to be wider and, thus, no longer optimal or electronically adjustable. Solutions involving adjustable filters can be realized with modern possibilities of circuit technology at moderate additional costs. Examples of solution approaches are varactors in oscillating circuits or resonance amplifiers, switched capacitor architectures with frequency adjustment via power sources or switch frequencies, digital filters via software-adjustable coefficients, or digital filters in combination with variable screening frequency. By using a second DDS module instead of a fixed frequency divider, the described degree of freedom could also be used with a fixed intermediate frequency filter in such a way that the pulse repetition frequency and the frequency difference are changed simultaneously, so that the same intermediate frequency results.

The invention claimed is:

1. Frequency generator for generating two pulse repetition frequency signals with slightly different frequencies for a radar measuring device that functions according to the pulse correlation principle, wherein the frequency generator has: an oscillator (400) that generates an oscillator signal, a first signal path for generating a first pulse repetition frequency signal from the oscillator signal, wherein the first signal path comprises:
   a frequency divider (401) or a first DDS module, which is designed to generate a first frequency signal based upon the oscillator signal,
   a first mixer (403) that is designed to upmix the first frequency signal or a signal derived therefrom to an intermediate frequency band and to generate a first intermediate frequency signal,
   a first ceramic bandpass filter (405) that is designed to filter out a selected frequency component of the first intermediate frequency signal and to generate a first bandpass-filtered intermediate frequency signal, a second signal path for generating a second pulse repetition frequency signal from the oscillator signal, wherein the second signal path comprises:
   a second DDS module (408) that is designed to generate a second frequency signal based upon the oscillator signal, which second frequency signal differs from the first frequency signal by a specified frequency offset,
   a second mixer (410) that is designed to upmix the second frequency signal or a signal derived therefrom to an intermediate frequency band and to generate a second intermediate frequency signal,
   a second ceramic bandpass filter (411) that is designed to filter out a selected frequency component of the second intermediate frequency signal and to generate a second bandpass-filtered intermediate frequency signal;
   wherein the second frequency divider is arranged in parallel to the first frequency divider or DDS respectively, and
   wherein the second ceramic band pass filter is arranged in parallel to the first ceramic band pass filter.

2. Frequency generator according to claim 1, characterized by at least one of the following:
   the bandpass-filtered first intermediate frequency signal or a signal derived therefrom is suitable for controlling the pulsed operation of a radar transmission oscillator of the radar measuring device as a first pulse repetition frequency signal;
   the bandpass-filtered second intermediate frequency signal or a signal derived therefrom is suitable for controlling the pulsed operation of a local oscillator of the radar measuring device as a second pulse repetition frequency signal.

3. Frequency generator according to claim 1, characterized by at least one of the following:
   the frequency of the oscillator signal is lower than 100 MHz;
   the frequency of the oscillator signal is within the range of 1 MHz to 100 MHz;
   the frequency ratio between the first frequency signal and the oscillator signal is smaller than 1:10;
   the frequency ratio between the second frequency signal generated by the second DDS module and the oscillator signal is smaller than 1:10;
   the first frequency signal and the second frequency signal each have a frequency within the range of 100 kHz to 1 MHz;
   the frequency offset between the first frequency signal and the second frequency signal can be variably adjusted by means of the second DDS module;
   the frequency offset between the first frequency signal and the second frequency signal can be variably adjusted by means of the second DDS module, depending upon the reception conditions and radar targets;
   the frequency offset between the first frequency signal and the second frequency signal lies within the range of between 5 Hz and several hundred Hz;
   the first frequency signal has a frequency that is so low that the first frequency signal cannot be used directly as first pulse repetition frequency signal;
   the second frequency signal has a frequency that is so low that the second frequency signal cannot be used directly as second pulse repetition frequency signal;
   the first pulse repetition frequency signal has a frequency within the range of between 1 MHz and 5 MHz;
   the second pulse repetition frequency signal has a frequency within the range of between 1 MHz and 5 MHz.

4. Frequency generator according to claim 1, characterized by at least one of the following:
   the first signal path comprises a low-pass that is arranged between the frequency divider or the first DDS module and the first mixer and is designed to suppress high frequency interference components of the first frequency signal and to generate a first low-pass filtered frequency signal;
   the second signal path comprises a low-pass that is arranged between the DDS module and the second mixer and is designed to suppress high frequency interference components of the second frequency signal and to generate a second low-pass filtered frequency signal.

5. Frequency generator according to claim 1, characterized by at least one of the following:
   the first intermediate frequency signal and the second intermediate frequency signal lie in an intermediate frequency band for which ceramic bandpass filters of high quality are available;
   the first intermediate frequency signal and the second intermediate frequency signal lie in an intermediate frequency band within the range of 10 MHz to 15 MHz;
   the first intermediate frequency signal and the second intermediate frequency signal lie in an intermediate frequency band that lies at higher frequencies than the frequencies of the first pulse repetition frequency signal and the second pulse repetition frequency signal;
   the frequency of the first intermediate frequency signal is so high that the first intermediate frequency signal cannot be used directly as first pulse repetition frequency signal;
   the frequency of the second intermediate frequency signal is so high that the second intermediate frequency signal cannot be used directly as second pulse repetition frequency signal.

6. Frequency generator according to claim 1, characterized by at least one of the following:
   the first ceramic bandpass filter is designed to allow a selected frequency component of the first intermediate frequency signal to pass through, to filter away all other frequency components of the first intermediate frequency signal, and to generate a bandpass-filtered first intermediate frequency signal;

the second ceramic bandpass filter is designed to allow a selected frequency component of the second intermediate frequency signal to pass through, to filter away all other frequency components of the second intermediate frequency signal, and to generate a bandpass-filtered second intermediate frequency signal;

the first ceramic bandpass filter has a quality that makes it possible to selectively filter out a selected frequency component of the first intermediate frequency signal;

the second ceramic bandpass filter has a quality that makes it possible to selectively filter out a selected frequency component of the second intermediate frequency signal.

7. Frequency generator according to claim 1, characterized by at least one of the following:

the first signal path comprises a first final frequency divider that is arranged downstream of the first ceramic bandpass filter and is designed to divide down the frequency of the bandpass-filtered first intermediate frequency signal or a signal derived therefrom and to generate the first pulse repetition frequency signal;

the second signal path comprises a second final frequency divider that is arranged downstream of the second ceramic bandpass filter and is designed to divide down the frequency of the bandpass-filtered second intermediate frequency signal or a signal derived therefrom and to generate the second pulse repetition frequency signal.

8. Frequency generator for generating two pulse repetition frequency signals with slightly different frequencies for a radar measuring device that functions according to the pulse correlation principle, wherein the frequency generator has: an oscillator (600) that generates an oscillator signal, a first signal path for generating a first pulse repetition frequency signal from the oscillator signal, wherein the first signal path comprises:

a frequency divider (601) or a first DDS module that is designed, based upon the oscillator signal, to generate a first frequency signal, which, in the case of the frequency divider (601), comprises a number of harmonics or, in the case of the first DDS module, a number of image frequency components, a first ceramic bandpass filter (602) that is designed to filter out a specified harmonic or a specified image frequency component of the first frequency signal and to generate a bandpass-filtered first intermediate frequency signal, a second signal path for generating a second pulse repetition frequency signal from the oscillator signal, wherein the second signal path comprises:

a second DDS module (605) that is designed to generate a second frequency signal based upon the oscillator signal, which second frequency signal differs from the first frequency signal by a specified frequency offset, wherein the second frequency signal comprises a number of image frequency components, a second ceramic bandpass filter (606) that is designed to filter out a specified image frequency component of the second frequency signal and to generate a bandpass-filtered second intermediate frequency signal;

wherein the second frequency divider is arranged in parallel to the first frequency divider or DDS respectively, and wherein the second ceramic band pass filter is arranged in parallel to the first ceramic band pass filter.

9. Frequency generator according to claim 8, characterized by at least one of the following:

the bandpass-filtered first intermediate frequency signal or a signal derived therefrom is, as first pulse repetition frequency signal, usable for controlling a pulsed operation of a radar transmission oscillator of the radar measuring device, the bandpass-filtered second intermediate frequency signal or a signal derived therefrom is, as second pulse repetition frequency signal, usable for controlling a pulsed operation of a local oscillator of the radar measuring device.

10. Radar measuring device for pulse correlation radar, which comprises:

a radar transmission path for transmitting a radar transmission signal, which is pulse-modulated in accordance with a first pulse repetition frequency signal, a radar reception path for reception and analysis of a radar transmission signal that has been reflected by a target (104), wherein the radar reception path comprises a reception mixer (105), which mixes the radar reception signal with a local oscillator signal, which is pulse-modulated in accordance with a second pulse repetition frequency signal and that generates a reception mixer output signal, a frequency generator according to claim 1, which is designed to generate the first pulse repetition frequency signal for a radar transmission oscillator (101) and the second pulse repetition frequency signal for a local oscillator (107), and an analysis unit (108), which is designed, based upon the reception mixer output signal or a signal derived therefrom, to determine a target distance.

11. Radar measuring device according to claim 10, characterized by at least one of the following:

the analysis unit is designed to variably adjust the frequency difference between the first pulse repetition frequency signal and the second pulse repetition frequency signal, depending upon the ambient conditions and radar targets;

the frequency difference between the first pulse repetition frequency signal and the second pulse repetition frequency signal defines a correlation speed for the analysis of the radar reception signal, wherein a low frequency difference leads to a correspondingly slow correlation speed;

the analysis unit is designed to variably adjust the frequency difference between the first pulse repetition frequency signal and the second pulse repetition frequency signal, depending upon the distance of a radar target, wherein a smaller frequency difference is set for radar targets that are positioned at a farther distance than for radar targets that are less far away;

the analysis unit is designed to variably adjust the frequency difference between the first pulse repetition frequency signal and the second pulse repetition frequency signal, depending upon the reflectivity of a radar target;

the analysis unit is designed to periodically tune the frequency difference, depending upon the distance of the radar target, wherein a smaller frequency difference is set for radar targets that are positioned at a farther distance than for radar targets that are less far away.

12. Radar measuring device according to claim 10, characterized by at least one of the following:

the radar measuring device is a device for distance measurement;

the radar measuring device is a fill level measuring device, which is designed to determine the fill level in a container;

the radar measuring device is a field device for process automation technology.

13. A method for generating two pulse repetition frequency signals with slightly different frequencies for a radar measuring device that functions according to the pulse correlation principle, wherein the method comprises the following steps:

generating an oscillator signal;

generating a first frequency signal based upon the oscillator signal by means of a frequency divider (401) or a first DDS module;

upmixing the first frequency signal or a signal derived therefrom to an intermediate frequency band and generating a first intermediate frequency signal;

filtering out a selected frequency component of the first intermediate frequency signal by means of a first ceramic bandpass filter (405) and generating a bandpass-filtered first intermediate frequency signal, wherein the bandpass-filtered first intermediate frequency signal or a signal derived therefrom is usable as a first pulse repetition frequency signal;

generating a second frequency signal based upon the oscillator signal by means of a second DDS module, wherein the second frequency signal differs from the first frequency signal by a specified frequency offset;

upmixing the second frequency signal or a signal derived therefrom to an intermediate frequency band and generating a second intermediate frequency signal;

filtering out a selected frequency component of the second intermediate frequency signal by means of a second ceramic bandpass filter (411) and generating a bandpass-filtered second intermediate frequency signal, wherein the bandpass-filtered second intermediate frequency signal or a signal derived therefrom is usable as a second pulse repetition frequency signal.

14. A method for generating two pulse repetition frequency signals with slightly different frequencies for a radar measuring device that functions according to the pulse correlation principle, wherein the method comprises the following steps:

generating an oscillator signal;

generating a first frequency signal based upon the oscillator signal by means of a frequency divider (601) or a first DDS module, wherein the first frequency signal, in the case of the frequency divider (601), comprises a number of harmonics or, in the case of the first DDS module, a number of image frequency components;

filtering out a specified harmonic or a specified image frequency component of the first intermediate frequency signal by means of a first ceramic bandpass filter (602) and generating a bandpass-filtered first intermediate frequency signal, wherein the bandpass-filtered first intermediate frequency signal or a signal derived therefrom is usable as a first pulse repetition frequency signal;

generating a second frequency signal based upon the oscillator signal by means of a second DDS module (605), wherein the second frequency signal differs from the first frequency signal by a specified frequency offset, wherein the second frequency signal comprises a number of image frequency components;

filtering out a specified image frequency component of the second intermediate frequency signal by means of a second ceramic bandpass filter (606) and generating a bandpass-filtered second intermediate frequency signal, wherein the bandpass-filtered second intermediate frequency signal or a signal derived therefrom is usable as a second pulse repetition frequency signal.

* * * * *